Figure 1:
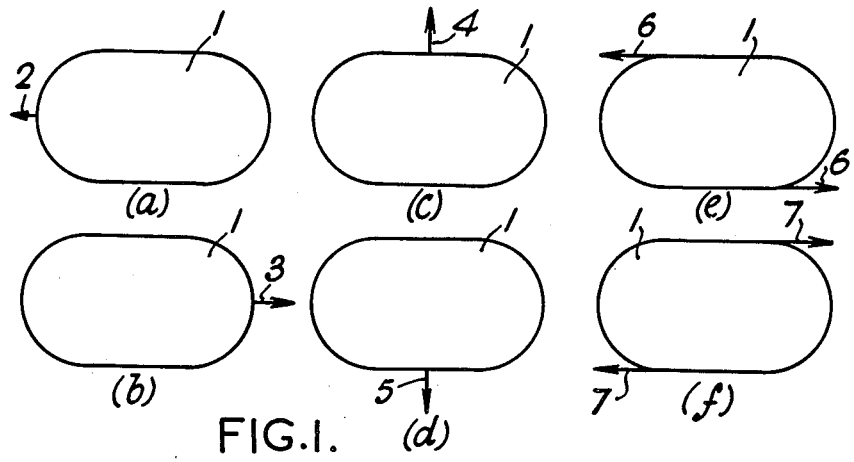

Dec. 22, 1964   C. S. COCKERELL   3,162,260
VEHICLE FOR TRAVELLING OVER LAND AND/OR WATER
Filed May 31, 1960   6 Sheets-Sheet 3

C. S. COCKERELL
INVENTOR

C. S. COCKERELL
INVENTOR

FIG. 10.
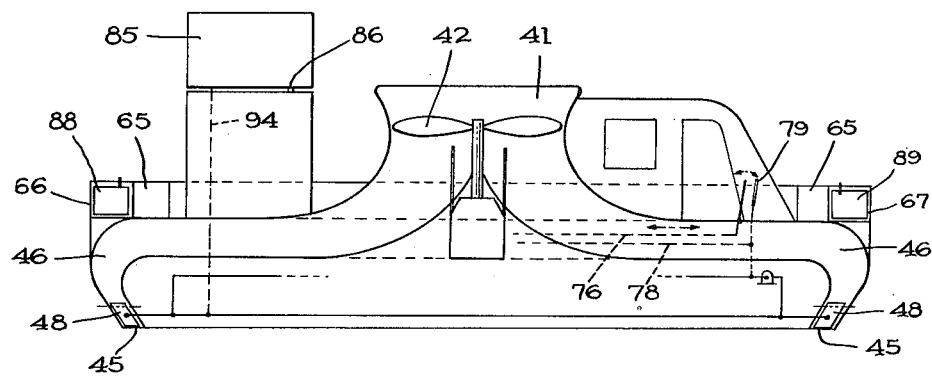
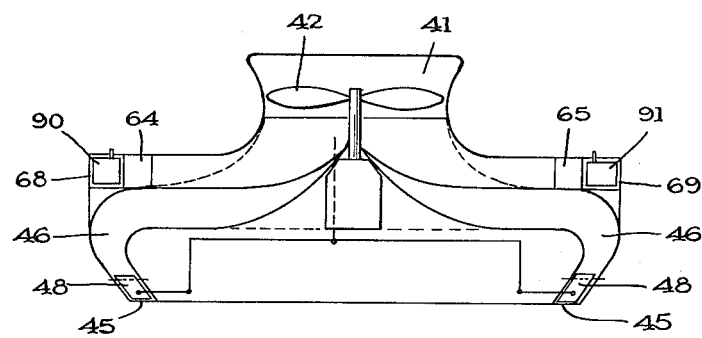
FIG. 11.

Dec. 22, 1964     C. S. COCKERELL     3,162,260
VEHICLE FOR TRAVELLING OVER LAND AND/OR WATER
Filed May 31, 1960     6 Sheets-Sheet 6

INVENTOR
C. S. COCKERELL
BY
Cameron, Kerkam & Sutton
ATTORNEYS

United States Patent Office 3,162,260
Patented Dec. 22, 1964

1

3,162,260
VEHICLE FOR TRAVELLING OVER LAND
AND/OR WATER
Christopher Sydney Cockerell, East Cowes, Isle of Wight, England, assignor to Hovercraft Development Limited, London, England, a British company
Filed May 31, 1960, Ser. No. 33,025
Claims priority, application Great Britain June 10, 1959
5 Claims. (Cl. 180—7)

This invention relates to vehicles of the type which are supported, partly or wholly, above the surface over which they are hovering or travelling by one or more cushions of pressurised fluid, generally air, beneath the vehicle.

The cushion or cushions of fluid may be formed and maintained beneath the vehicle by any suitable means. One such means is described in the specification of co-pending patent application No. 627,925 and comprises one or more curtains of fluid which travel across the gap that in operation exists between the surface over which the vehicle is operating and the structure of the vehicle. Other cushion forming and containing means may also be used but for convenience in the descriptions of various embodiments of the invention below, it will be assumed that the cushion forming and containing means comprises one or more curtains of fluid around at least part of the periphery of the bottom of the vehicle. The curtains may be of a simple form as described in the specification of the aforementioned patent application No. 627,925 or of a more complex form in which, for example, at least part of the curtain forming fluid is recovered and re-used, such as is described in the specifications of co-pending patent applications Nos. 837,428 and 809,699.

The invention is also applicable to mobile platforms and the term vehicle as used herein is to be understood, where the context permits, as including a mobile platform.

The present invention is concerned with means for providing various forces on the vehicle and means for controlling such forces such that the direction of movement of the vehicle can be controlled and the vehicle can be held stationary if desired. One of the characteristics of a vehicle of the type described is its lack of resistance to sideways movement or drift. On the other hand, the vehicle has substantially the degree of safety of a surface vehicle in that it can return to the surface over which it is operating rapidly and easily without danger, and can be made to be safe when resting on the surface without impairing its operating efficiency. It is an object of the invention to provide a system of directional stability and control, the operation of which gives the vehicle the familiar characteristics of a surface vehicle.

According to the invention, a vehicle of the type described above is provided with means for producing a resultant thrust variable in magnitude and direction and having a component in a plane parallel to the bottom surface of the vehicle, so as to bring about the relative movement of the vehicle in any desired direction, and means capable of exerting, about a vertical axis, a turning moment on the vehicle such as to ensure directional stability.

The term "directional stability" is used in the sense that the vehicle has directional stability if its longitudinal axis is maintained in the direction of that velocity which, when vectorially added to any velocity of the medium in which or over which the vehicle is travelling and which is imparted to the vehicle produces a resultant velocity substantially parallel to the course on which the vehicle is set.

Preferably there is also provided means for controlling and modifying at will the turning moment about a vertical axis exerted on the vehicle.

2

The forces and moments acting upon the vehicle are capable of holding the vehicle stationary against the action of extraneous forces.

Figure 2:
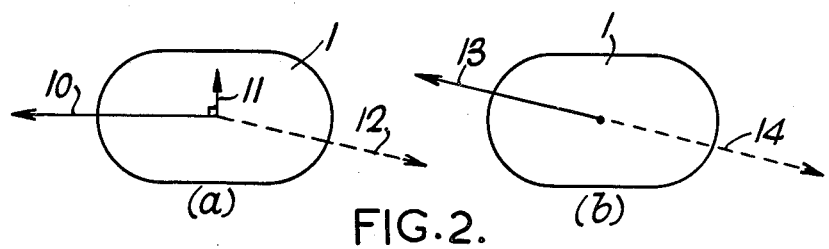
Figure 3:
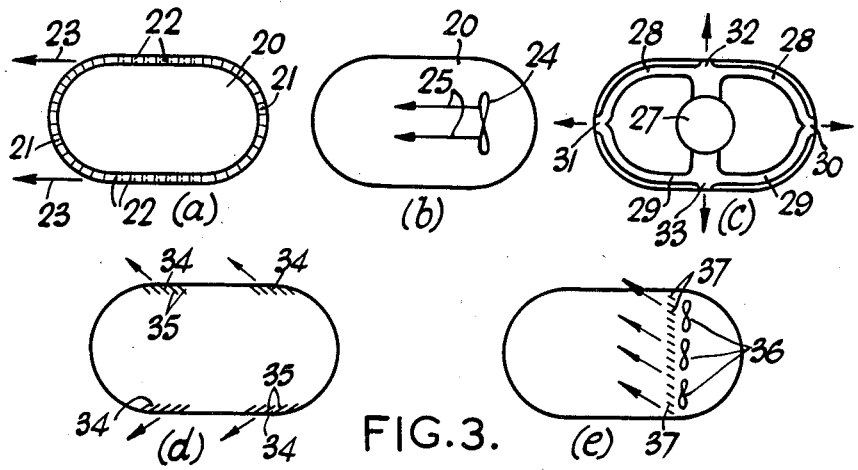
Figure 4:
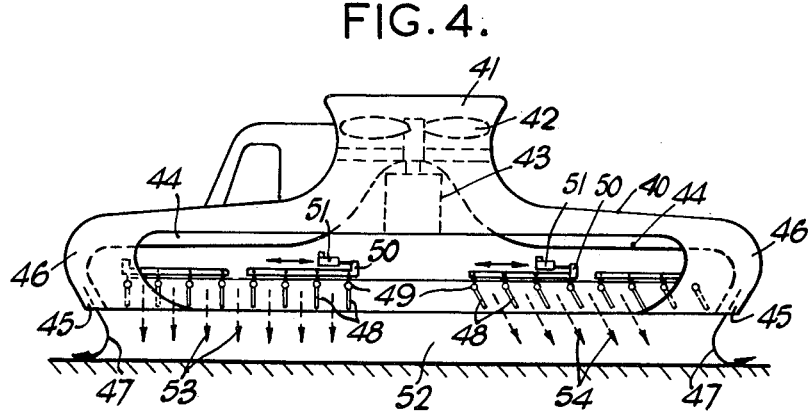
Figure 5:
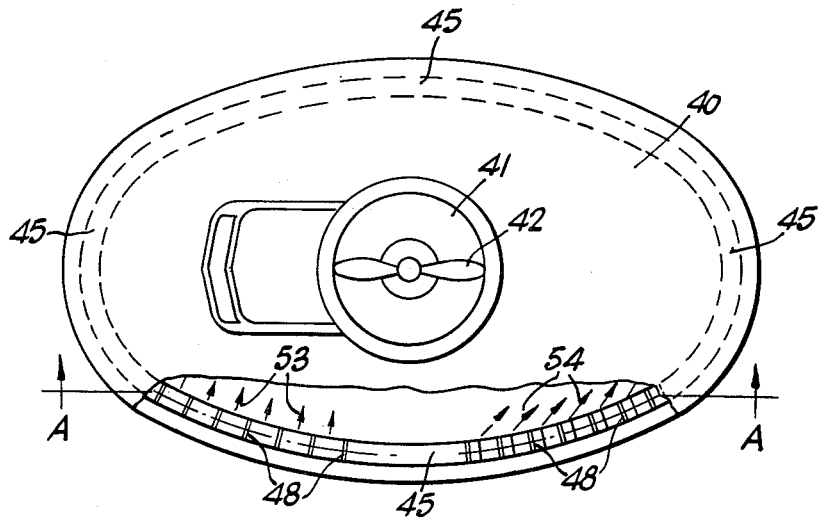
Figure 6:
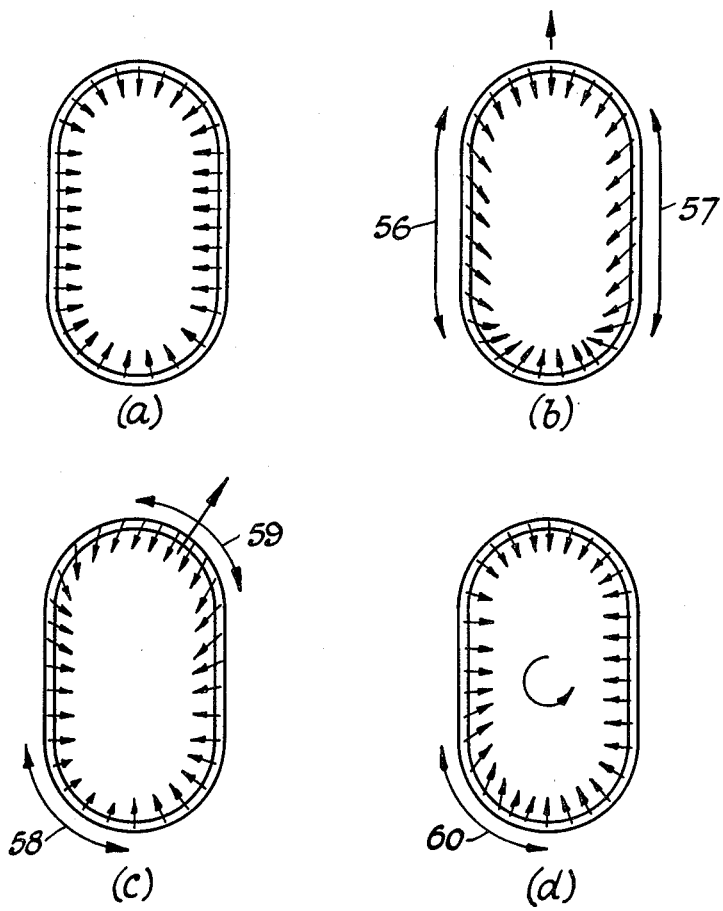
Figure 7:
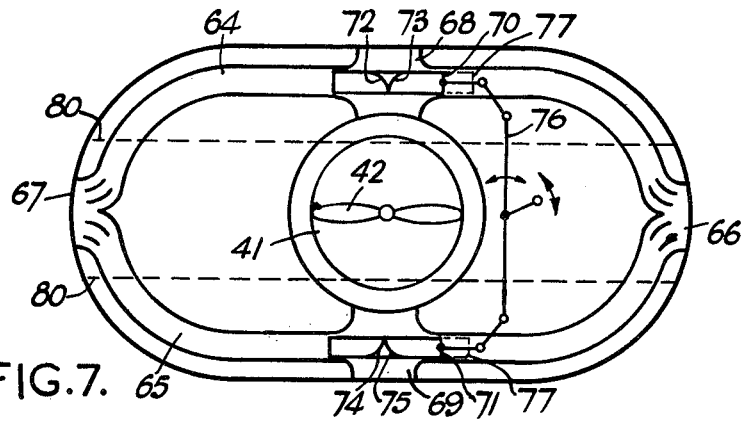
Figure 8:
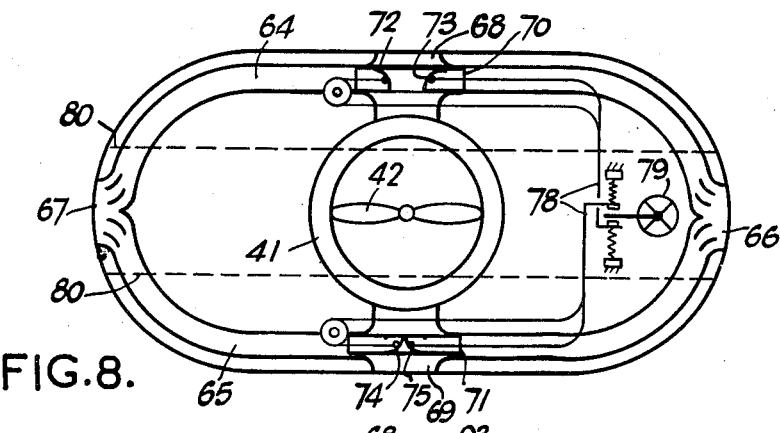
Figure 9:
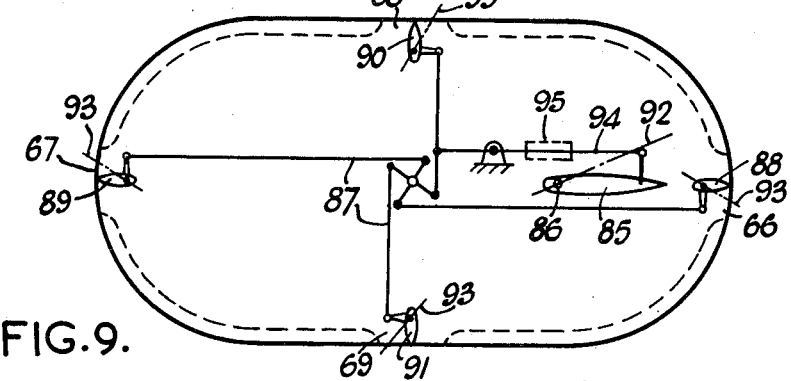
Figure 12:
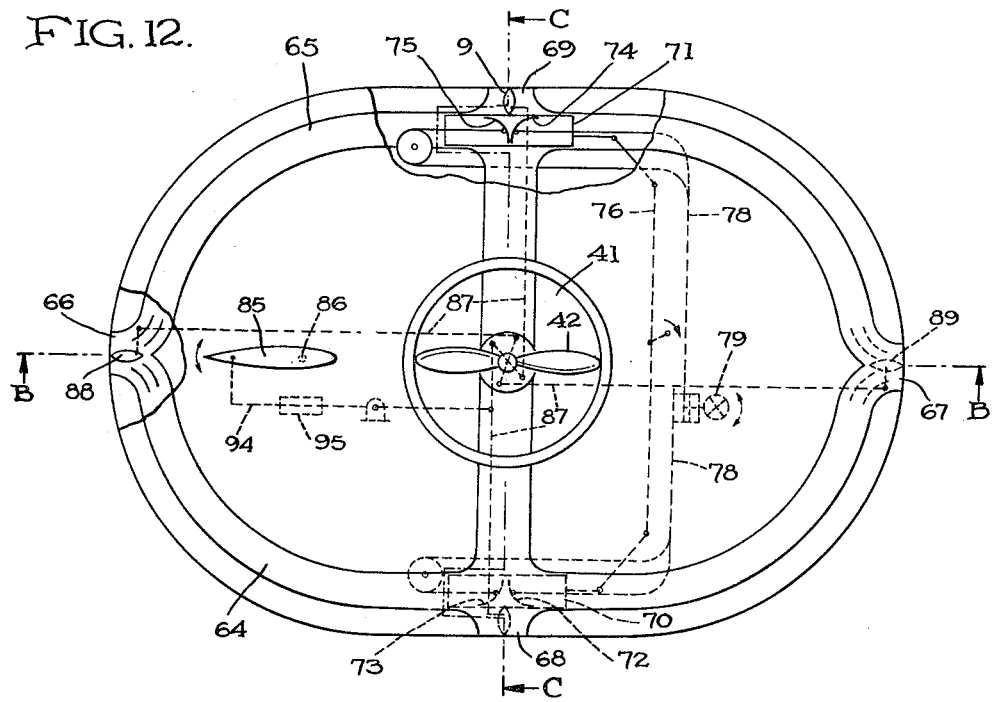
Figure 13:
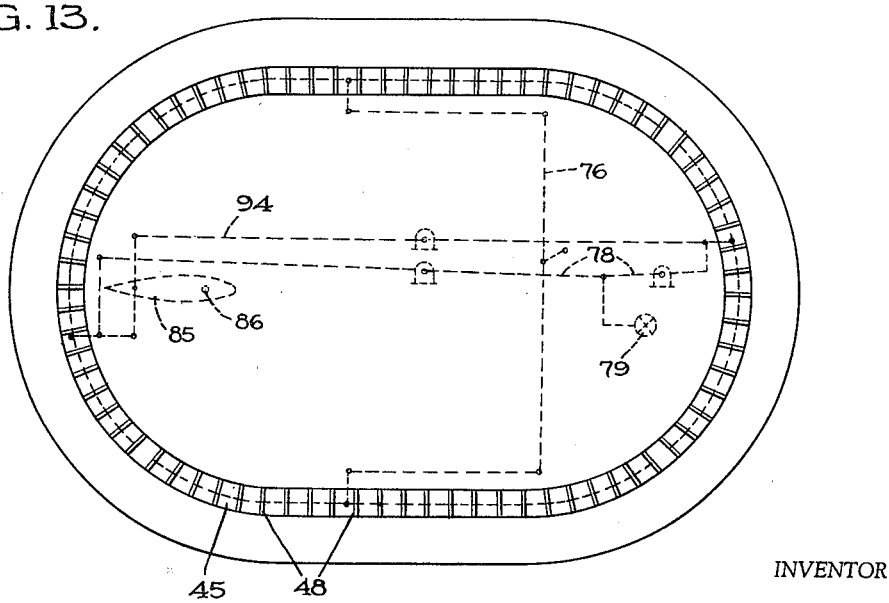

The invention will be more readily understood by the following descriptions of various features of the invention in conjunction with the accompanying drawings in which:

FIGURES 1(a)–(f) illustrate diagrammatically various forces which can be caused to act on a vehicle, FIGURES 2(a) and (b) illustrate diagrammatically further examples of forces which can be caused to act on a vehicle, FIGURES 3(a)–(e) illustrate diagrammatically various methods of producing forces on a vehicle, FIGURE 4 is a vertical section on the line A—A in FIGURE 5 of a vehicle according to the invention illustrating one of the methods of FIGURE 3 in more detail, FIGURE 5 is a plan view, partially broken away, of the vehicle illustrated in FIGURE 4, FIGURES 6(a)–(d) are diagrammatic inverted plan views of a vehicle having vanes like those illustrated in FIGURES 4 and 5 showing one of the methods of FIGURE 3 in more detail, FIGURE 7 is a diagrammatic horizontal cross-sectional plan view of another form of vehicle according to the invention showing a further one of the methods of FIGURE 3 in more detail, FIGURE 8 is a plan view similar to FIGURE 7 but with operating parts in different positions, FIGURE 9 is a plan view similar to FIGURES 7 and 8 illustrating one means of providing directional stability, FIGURES 10 and 11 are diagrammatic longitudinal and transverse vertical sections of another form of vehicle according to the invention taken on the lines B—B and C—C, respectively, in FIGURE 12, FIGURE 12 is a diagrammatic top plan view, partially broken away, of the vehicle illustrated in FIGURES 10 and 11, and FIGURE 13 is a diagrammatic inverted plan view of the vehicle illustrated in FIGURES 10–12.

In order to propel, slow down, stop, turn and manoeuvre a vehicle certain forces must be produced to act upon a vehicle. FIGURE 1 is a series of diagrammatic plan views of a vehicle 1 showing various forces which it is required to produce and act upon a vehicle. In FIGURE 1(a) a rearward acting force 2 is shown which propels the vehicle 1 forward. In FIGURE 1(b) a forward acting force 3 is shown which is required for slowing and stopping the vehicle, or propelling it backwards. FIGURES 1(c) and (d) show respectively sideways acting forces 4 and 5. These forces can be used to move the vehicle sideways or to hold it stationary against an extraneous side force such as the wind. FIGURES 1(e) and 1(f) show turning moments 6 and 7 respectively which can be used to rotate the vehicle about a vertical axis. The strengths of the various forces can be varied and also used individually or in conjunction with one another to move the vehicle in any particular direction, or to hold the vehicle stationary and to align the fore and aft axis of the vehicle in any direction. The various forces can be generated by any suitable means such as by jets of fluid, propellers or other thrust producing means. Where a fluid is ejected through ports in the bottom of the vehicle, for example for producing a curtain or curtains of fluid, thrust may also be produced by tilting the vehicle. Two or more means may be used in combination.

However, although the forces can be produced independently and combined to produce the required resultant force this does not produce the thrust in the most efficient manner. This is illustrated diagrammatically in FIGURE 2. In FIGURE 2(a) the vehicle 1 has acting upon it two forces 10 and 11 at right angles. Force 10 propels the vehicle forward and force 11 adds a sideways component of motion. Thus the final direction of movement is as indicated by the arrow 12. In FIGURE 2(b) a single force 13 acts upon the vehicle exactly in line with the desired direction of movement shown by the arrow 14. This provides a thrust to propel the vehicle in the direction required in the most efficient manner.

FIGURE 3 illustrates diagrammatically various methods, by way of example, of producing various forces and moments on a vehicle. FIGURE 3(a) is an inverted plan view of a vehicle 20 showing an annular supply port 21, adjacent to and parallel to the periphery of the bottom of the vehicle, through which issues air to form a continuous curtain which forms and maintains the aforesaid cushion or cushions of pressurised air. Vanes 22 are provided in the port 21 and by suitably inclining the vanes, for example along each side of the vehicle, rearward components of thrust 23 are developed by the curtain forming air which propels the vehicle forward. Alternatively, as shown in FIGURE 3(b) which is a plan view, propulsion may be by a separate propulsion comprising a propeller 24 which produces a force 25. The methods shown in FIGURES 3(a) and 3(b) may also be combined. FIGURE 3(c) is a plan view of a further vehicle, in which air is drawn in through a central air inlet 27 and is expelled into ducts 28 and 29, adjacent to the periphery of the vehicle. Ports 30 and 31 are provided at the front and rear respectively of the vehicle and further ports 32 and 33 are provided one on each side of the vehicle. Suitable control means is provided to control the flow of air from any or all of the ports as required, as described below with reference to FIGURES 7–9. FIGURE 3(d) is a plan view of a vehicle in which instead of the ports being positioned one at each end and one on each side as in FIGURE 3(c), it has ports 34 provided on each side of the vehicle, one on each side towards the front and one on each side towards the rear. Movable vanes 35 in the ports 34 can be rotated about vertical axes to vary the direction of flow of air from the ports and thus vary the resultant thrust direction at each port. FIGURE 3(e) is a plan view of a vehicle which is propelled by a series of propellers 36. Behind the propellers are mounted vanes 37 each capable of rotation about a vertical axis. By rotating the vanes 37 about these vertical axes the direction of thrust can be varied. It will be appreciated that a combination of two or more of the examples illustrated in FIGURES 3 can be used, and that other examples, not shown, can also be used.

Where, as shown in FIGURE 3(a) for example, the control thrusts are produced by varying the direction of expulsion of the curtain forming air, then a simple method of obtaining the thrusts, as stated above, is by providing movable vanes in the supply port, or ports, where a simple curtain system is used, or in either the supply or recovery ports where a more complex curtain system, with curtain air recovery, is used. In the latter system, vanes may also be provided in both supply and recovery ports. FIGURE 4 is a vertical section through a vehicle, on the line A—A of FIGURE 5, showing the provision of vanes in the supply port of a vehicle having a single annular simple curtain system. FIGURE 5 is a plan view of the vehicle with part of the top surface removed to show the positioning of the vanes in a port. The method of mounting and operating the vanes is not materially altered for any other curtain system. The vehicle has a body 40 with an air intake 41. Situated in the intake is a single stage air compressor 42, in the form of an airscrew, driven by a motor 43. In operation air flows from the compressor 42 into a chamber 44 extending over the whole area of the vehicle. An annular supply port 45 is formed in the bottom of the vehicle adjacent and parallel to the periphery thereof, and air flows from the chamber 44 via a duct 46 to the supply port from which it issues to form a curtain of air 47. Vanes 48, pivotally mounted at their top edges 49, are provided in the supply port and are rotated about a horizontal axis through the pivots by an actuating rod 50 and an actuator 51. For convenience in operation and to enable local variation of the vanes, they are connected together, and operated, in small groups. Air issues from the supply port in an inward and downward direction and is then deflected round and outward, as shown, in contact with the surface over which the vehicle is operating, by the pressure of the cushion of air formed in the space 52. If the vanes 48 are vertical, as shown on the left of FIGURES 4 and 5, then the air issues from the supply port in a radial direction as shown by the arrows 53. If the vanes are given a rearward inclination as shown on the right of FIGURES 4 and 5, then the air issues from the supply port with a rearward component as shown by the arrows 54. If this is done on both sides of the vehicle then a rearward thrust is produced which propels the vehicle forward. Inclination of the vanes in the reverse direction will produce a braking or backward propelling thrust, while inclination of the vanes at the front and rear of the vehicle will produce a sideways thrust on the vehicle. A turning moment can be produced by inclining the vanes on one side, and/or at one end, in one direction and the vanes on the other side, and/or other end, in the opposite direction.

In FIGURE 6 are shown various diagrammatic plan views illustrating the obtaining of resultant thrusts for various purposes by means of vanes as described above in relation to FIGURES 4 and 5. In FIGURE 6(a) the vanes are inoperative, that is they are in a vertical orientation, and the curtain forming air issues from the supply port conventionally having a combined thrust towards the centre of the vehicle as shown by the arrows. In this example there would be no resultant thrust tending to move the vehicle. In FIGURE 6(b), the vanes in that part of the supply port which forms the side curtains, portions 56 and 57, are given an inclination which produces a rearwards resultant thrust as shown by the arrows. This will cause the vehicle to move forwards. In FIGURE 6(c) the vanes in the portions 58 and 59 of the supply port are given an inclination which produces thrust as shown, resulting in a movement of the vehicle at an angle to its longitudinal axis. A turning moment is obtained by producing an asymmetrical thrust on the vehicle. This can be obtained as shown in FIGURE 6(d) by inclining a number of the vanes in a local portion 60 of the supply port. Vanes can be suitably inclined at more than one local portion of the supply port, and the magnitude of the turning moment can be varied both by the degree of inclination of the vanes and by the number inclined, which may vary from a minimum of one to a maximum of the total number provided.

It will thus be seen that by inclining the correct vanes, a resultant thrust in any direction can be obtained, and it is possible to combine two or more of the various examples of guide vane inclination. Where the inclining of guide vanes is only carried out over part, or parts, of the whole periphery, the angle of inclination may be "tapered off" at each end of that part of the periphery in order to prevent a too drastic alteration in curtain configuration.

Where the control thrusts are produced by the propulsion air, the propulsion air being separate from the curtain forming air, various methods of producing the control thrusts may be used. FIGURES 7 and 8, which are diagrammatic plan views of a vehicle similar in many ways to that shown in FIGURES 4 and 5, illustrate one particular method. The propulsion air is fed from an air intake 41 having a compressor 42 mounted therein, as in FIGURES 4 and 5, to two ducts 64 and 65 extending the length of the vehicle, one on each side. Air is also fed from the compressor 42 to an annular supply port in the bottom of the vehicle, as in FIGURES 4 and 5, for the formation of the air curtain. The ends of the ducts 64 and 65 open into ports 66 and 67 at the front and rear of the vehicle respectively. A port 68 is formed at the centre position of duct 64 facing outwards and a similar port 69 is formed in the duct 65.

Mounted in the ducts 64 and 65 at the midposition are slide members 70 and 71 provided with separately slidable vanes 72, 73, 74 and 75, one slide member being in each duct and positioned so as to control the flow of air from the air inlet 41 into the ducts. The slide members operate as follows. With the slide members situated centrally with respect to the flow from the air inlet 41 and both vanes in each slide member in a closed position as shown in FIGURE 7, air from the inlet is divided equally to front and back along the ducts 64 and 65. This will, of course, produce no resultant thrust. If now, by suitable linkage 76, the slide members are moved to a position shown by the dotted lines 77, then a greater proportion of the air is deflected by the vanes towards port 67. As this port is at the rear of the vehicle there will be a resultant thrust tending to drive the vehicle forward. Similarly movement of the slide members in the reverse direction will cause a resultant thrust in the other direction.

For sideways movement the separately slidable vanes 72, 73, 74 and 75 are moved by suitable linkage 78 from wheel 79 so as to allow air to issue through the ports 68 and 69. If vanes 72 and 73 are slid apart in the sliding member 70, as shown in FIGURE 8, then air will be expelled through port 68, causing a resultant thrust tending to move the vehicle sideways in a direction opposite to that of the air being expelled. Similarly, if vanes 74 and 75 are opened and vanes 72 and 73 closed a resultant thrust in the other direction will occur.

It will be seen that combined movement of the slidable members 70 and 71 and of one of the sets of vanes 72 and 73 or 74 and 75 can be made which will provide a resultant thrust at an angle to the longitudinal axis of the vehicle.

The linkage 76 for operating the slide members 70 and 71 and the linkage 78 for operating the slidable vanes 72, 73, 74 and 75 are shown separately in FIGURES 7 and 8 for clarity, but both linkages are, of course, provided in the one vehicle.

Where, in the examples described above, only directional thrusts are produced, without turning moments, then directional stability over water can be obtained by means of keels, indicated by dotted lines 80 in FIGURES 7 and 8, which are immersed in the water.

Thus when the direction of travel of the vehicle is to be altered, a thrust having a sideways component is exerted in the vehicle. This produces a tendency for the vehicle to move sideways, which tendency is resisted by the keel or keels. The result is that the vehicle turns until finally the longitudinal axis of the vehicle is in the direction required. The component of sideways thrust is either progressively reduced to zero as the vehicle turns, or may be more rapidly reduced to zero, or such other value as may be required, just before or at the time the longitudinal axis assumes the required direction, in the normal manner of steering a vehicle.

Instead of or in addition to any keels to provide directional stability, means controlled by a device whose orientation relative to the air through which or the water over which the vehicle is travelling, is constant. A simple device is a vane which is pivoted at one end to a point on the vehicle, the other end of the vane having pivoted to it a link which is connected by a series of parallel linkages, or by some other suitable means which may be hydraulic, electric or pneumatic, to either vanes in the ports 66, 67, 68 and 69 in FIGURES 7 and 8, or to the vanes 48 in the supply port 45 in FIGURES 4 and 5.

A construction having vanes in the ports 66, 67, 68 and 69 of the vehicle shown in FIGURES 7 and 8 is illustrated diagrammatically in FIGURE 9. A vane 85 is pivotally mounted at 86 on the vehicle and is operated upon by either the air through which the vehicle is travelling or by the water over which the vehicle is travelling. Movement of the vane 85 is transmitted by suitable linkage 87 to vanes 88, 89, 90 and 91 located in the ports 66, 67, 68 and 69, these ports being the same ports as in FIGURES 7 and 8. It will be seen that assuming that air is being expelled through nozzle 67 to drive the vehicle forwards, if for some reason there is a relative rotation of the vehicle clockwise about its central vertical axis, the vane 85 will be rotated anticlockwise relative to the vehicle by either the air or the water as indicated by the dotted line 92. This will cause clockwise rotation of vanes 88, 89, 90 and 91 to positions indicated by dotted lines 93, air being expelled from the port 67 acting on vane 89 to provide an increased anticlockwise turning moment on the vehicle. Similarly any air which is expelled from any of the other ports 66, 68 or 69 will act on the particular vane or vanes positioned in the port or ports through which the air is expelled.

For directional stability in a vehicle as shown in FIGURES 4 and 5 a vane mounted similarly to the vane 85 in FIGURE 9, can be used to control the variation of the inclination of the vanes 48 in the supply port 45. This variation is additional to any variation applied for propulsion.

When means are provided for controlling and modifying at will the turning moment exerted on the vehicle, such means alone can be used to change the direction of the vehicle provided it is travelling at a slow speed. If the turning moment is not applied too rapidly little or no "side-slip" or "crabbing" of the vehicle will occur. At higher speeds however, unless the turning moment is applied extremely slowly, which will make the turning circle of the vehicle unacceptably large, some sideways thrust or resistance is required. In a vehicle with a keel or keels, these will provide a degree of sideways resistance which may be sufficient. In vehicles without keels, or in which the keels do not provide sufficient sideways resistance, a component of sideways thrust must be provided to prevent "sideslip." The turning moment can be applied manually, and in the case of a vehicle as illustrated in FIGURE 9, preferably by an override.

The manual override may be a means for disconnecting the vane 85 from its linkage, the linkage then being operated directly by hand, or for example, the vanes 88, 89, 90 and 91 in FIGURE 9 may be individually or collectively disconnected and operated independently.

A bias may be imposed, to allow for a relative crossflow of the air or water, through which or over which the vehicle is travelling for example by providing means for varying the length of the link 94 in FIGURE 9 as indicated at 95 by dotted lines.

It will be understood that where more than one curtain is provided or where the air from a curtain is recirculated or otherwise recovered, the control vanes may be introduced at any point in the air flow such that a net resultant thrust is effective on the vehicle. An advantageous arrangement is one in which the air which forms the curtain is recovered through a port in the bottom of the vehicle inboard of that through which the curtain-forming jet issues, and this recovered air is deflected by control vanes which are movable in the manner described above. This enables air from any location in the vehicle to produce thrust in any direction.

A combination of the systems illustrated in the various figures can also be used. For example, the vehicle may be driven by separate propulsion ports, as ports 66 and 67 in FIGURES 7 and 8, while directional stability etc. is obtained by varying the angle of inclination of vanes in the air stream forming the curtain. A vehicle comprising the propulsion port and vane arrangement and control means of FIGURES 7, 8 and 9 in combination with the supply port vane arrangement of FIGURES 4 and 5 is illustrated in FIGURES 10-13 wherein the various elements are designated by the same reference numerals as in FIGS. 4, 5 and 7-9. Conversely, propulsion may be obtained by vanes of fixed inclination in the air stream forming the curtain, while separately fed ports, as ports 66, 67, 68 and 69 in FIGURES 7 and 8 are provided for directional stability and steering, and for stopping the vehicle.

In order to minimise sideways drift, while manoeuvering at slow speed, or while traversing narrow channels etc., a fixed or retractable keel or fin may be provided. Alternately fixed or retractable disc keels may be provided, the keels being free to rotate to minimise skin resistance. These keels may be used to resist the component of sideways thrust due to centrifugal force on the vehicle when on a curved course. The action of the keels may be such that the forces acting pass through, or nearly through the centre of gravity of the vehicle, to minimise the resultant rolling motion.

I claim:

1. A vehicle of the type adapted to hover or travel over a surface at a predetermined height which is small in relation to the size of said vehicle and having means which in operation produce and maintain a cushion of pressurised air underneath the vehicle, said vehicle additionally comprising means for producing a propulsive thrust operable to move said vehicle including at least one port through which fluid is expelled for producing a propulsive thrust having a component parallel to the fore and aft axis of the vehicle, at least one port through which fluid is expelled for producing a sideways thrust having a component normal to the fore and aft axis in one direction, at least one port through which fluid is expelled for producing a sideways thrust having a component normal to the fore and aft axis in the other direction, and means for supplying fluid to each of said ports, means for varying the relative mass flows of the fluid through said ports for controlling the direction of operation of the resultant thrust upon the vehicle, at least one vane in each of said ports mounted for movement about a vertical axis, and means for turning said vanes about the vertical axes thereof to deflect a controlled part of the thrust produced by the fluid issuing from said ports and thereby exert a turning moment about a vertical axis.

2. A vehicle of the type adapted to hover or travel over a surface at a predetermined height which is small in relation to the size of said vehicle and having means which in operation produce and maintain a cushion of pressurised air underneath the vehicle, said vehicle additionally comprising means for producing a propulsive thrust operable to move said vehicle including at least one port through which fluid is expelled for producing a propulsive thrust having a component parallel to the fore and aft axis of the vehicle, at least one port through which fluid is expelled for producing a sideways thrust having a component normal to the fore and aft axis in one direction, at least one port through which fluid is expelled for producing a sideways thrust having a component normal to the fore and aft axis in the other direction, and means for supplying fluid to each of said ports, means for varying the relative mass flows of the fluid through said ports for controlling the direction of operation of the resultant thrust upon the vehicle, at least one vane in each of said ports mounted for movement about a vertical axis, and means for turning said vanes about the vertical axes thereof to deflect a controlled part of the thrust produced by the fluid issuing from said ports and thereby exert a turning moment about a vertical axis, said vane turning means comprising a member exposed to the air through which the vehicle is travelling so as to be moved thereby relative to the vehicle and urged towards a constant orientation relative to the air, and means actuated by said member for controlling the movement of said vanes.

3. A vehicle of the type adapted to hover or travel over a surface at a predetermined height which is small in relation to the size of said vehicle and having means which in operation produce and maintain a cushion of pressurised air underneath the vehicle, said vehicle additionally comprising means for producing a propulsive thrust operable to move said vehicle including at least one port through which fluid is expelled for producing a propulsive thrust having a component parallel to the fore and aft axis of the vehicle, at least one port through which fluid is expelled for producing a sideways thrust having a component normal to the fore and aft axis in one direction, at least one port through which fluid is expelled for producing a sideways thrust having a component normal to the fore and aft axis in the other direction, and means for supplying fluid to each of said ports, means for varying the relative mass flows of the fluid through said ports for controlling the direction of operation of the resultant thrust upon the vehicle, at least one vane in each of said ports mounted for movement about a vertical axis, and means for turning said vanes about the vertical axes thereof to deflect a controlled part of the thrust produced by the fluid issuing from said ports and thereby exert a turning moment about a vertical axis, said vane turning means comprising a member exposed to the water over which the vehicle is travelling so as to be moved thereby relative to the vehicle and urged towards a constant orientation relative to the water, and means actuated by said member for controlling the movement of said vanes.

4. A vehicle of the type adapted to hover or travel over a surface at a predetermined height which is small in relation to the size of said vehicle and having means which in operation produce and maintain a cushion of pressurised air underneath the bottom of the vehicle, said vehicle additionally comprising four outwardly facing ports, one at the front, one at the rear, and one on each side of the vehicle, said ports being positioned on the fore and aft axis of the vehicle and the transverse axis of the vehicle, respectively, means for ejecting a fluid through said ports to provide a propulsive thrust, means for varying the relative mass flow of the fluid through said ports thereby varying the magnitude of the propulsive thrust and the direction of the propulsive thrust, a vane mounted for rotation about a vertical axis positioned in each of said ports, a member mounted on the vehicle and capable of rotation about a vertical axis, and linkage connecting said member and said vanes, movement of the member resulting from a variation of the orientation of the vehicle relative to a cooperating medium, such as the air, causing a rotation of said vanes to provide a turning moment on the vehicle tending to rectify said variation in orientation.

5. A vehicle of the type adapted to hover or travel over a surface at a predetermined height which is small in relation to the size of said vehicle and having means which in operation produce and maintain a cushion of pressurised air underneath the vehicle, said vehicle additionally comprising means for producing a propulsive thrust operable to move said vehicle, means for so controlling the operation of said thrust producing means as to vary the resultant direction of operation of said thrust upon the vehicle, means additional to said thrust producing means for exerting about a vertical axis a turning moment upon said vehicle, and means responsive to variations of the orientation of the vehicle from a predetermined orientation for varying said propulsive thrust and said turning moment, whereby said vehicle is controllable as to both its direction of movement and its heading in relation to its direction of movement.

References Cited in the file of this patent
UNITED STATES PATENTS
2,838,257   Wibault _____ June 10, 1958

FOREIGN PATENTS
5,391   Great Britain _____ Mar. 5, 1909
219,133   Australia _____ Nov. 24, 1958

OTHER REFERENCES
Publication: "Aviation Week," July 6, 1959, pages 115 and 116.